June 6, 1944.     L. H. MOOMAW ET AL     2,350,693
STRIP FEED MECHANISM
Filed Aug. 13, 1943     6 Sheets-Sheet 1
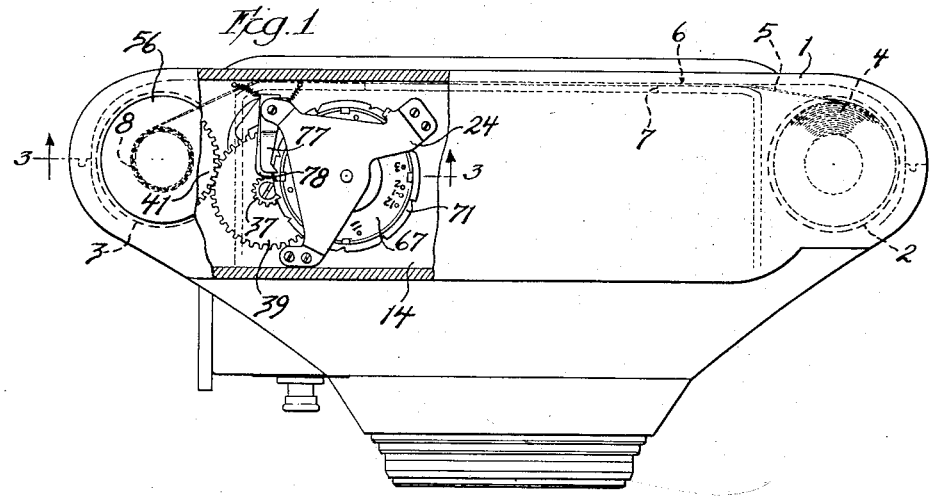
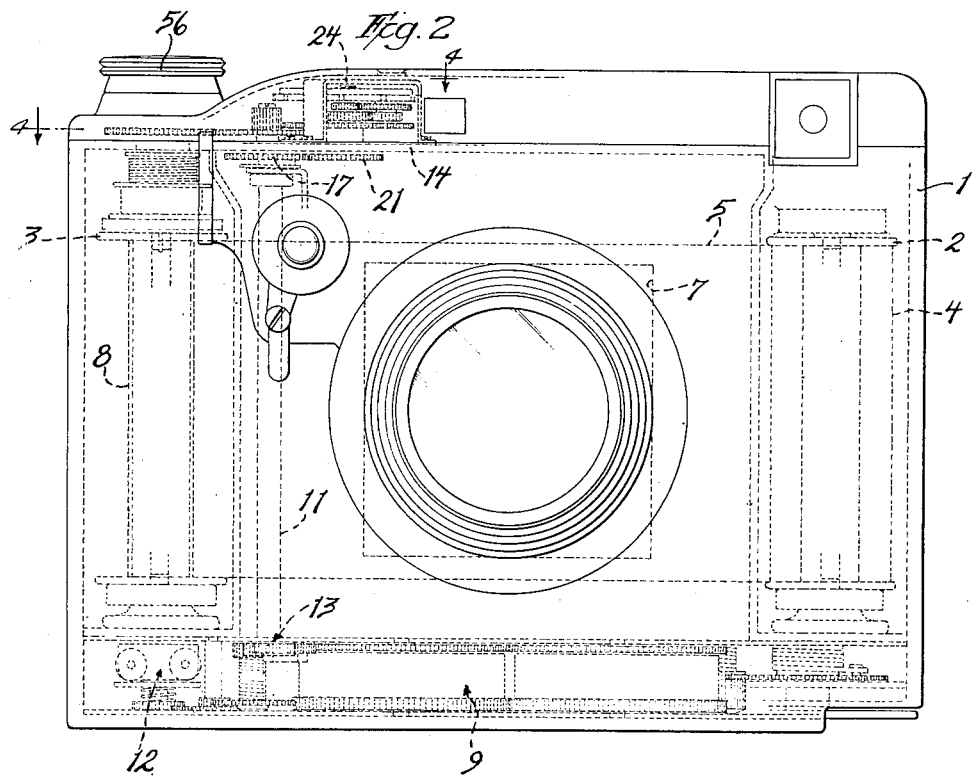
Inventors.
Lewis H. Moomaw
Hugo Bernzott June 6, 1944.   L. H. MOOMAW ET AL   2,350,693
STRIP FEED MECHANISM
Filed Aug. 13, 1943   6 Sheets-Sheet 2

Inventors.
Lewis H. Moomaw
Hugo Bernzott
BY
Atty.

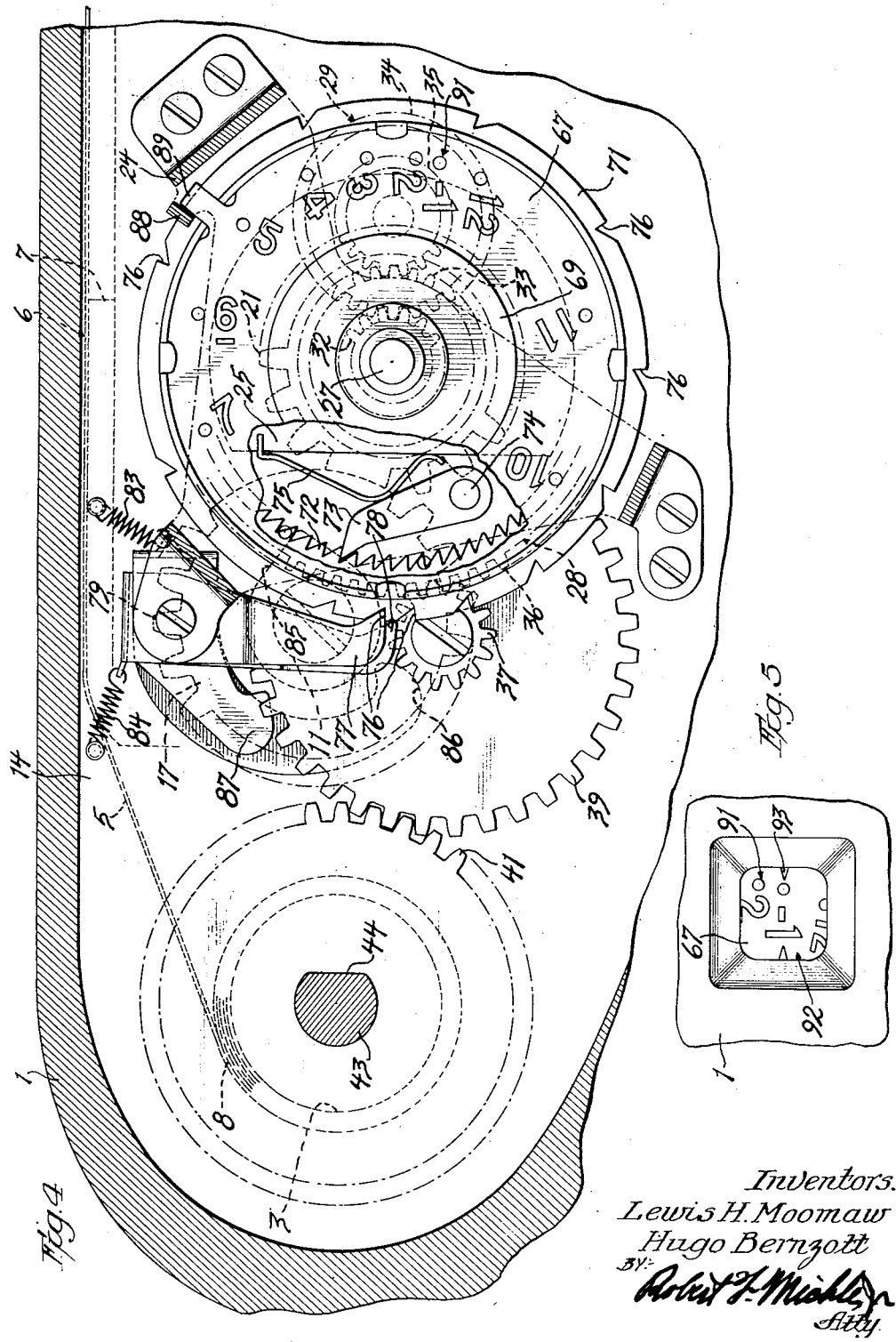

June 6, 1944.   L. H. MOOMAW ET AL   2,350,693
STRIP FEED MECHANISM
Filed Aug. 13, 1943   6 Sheets-Sheet 4
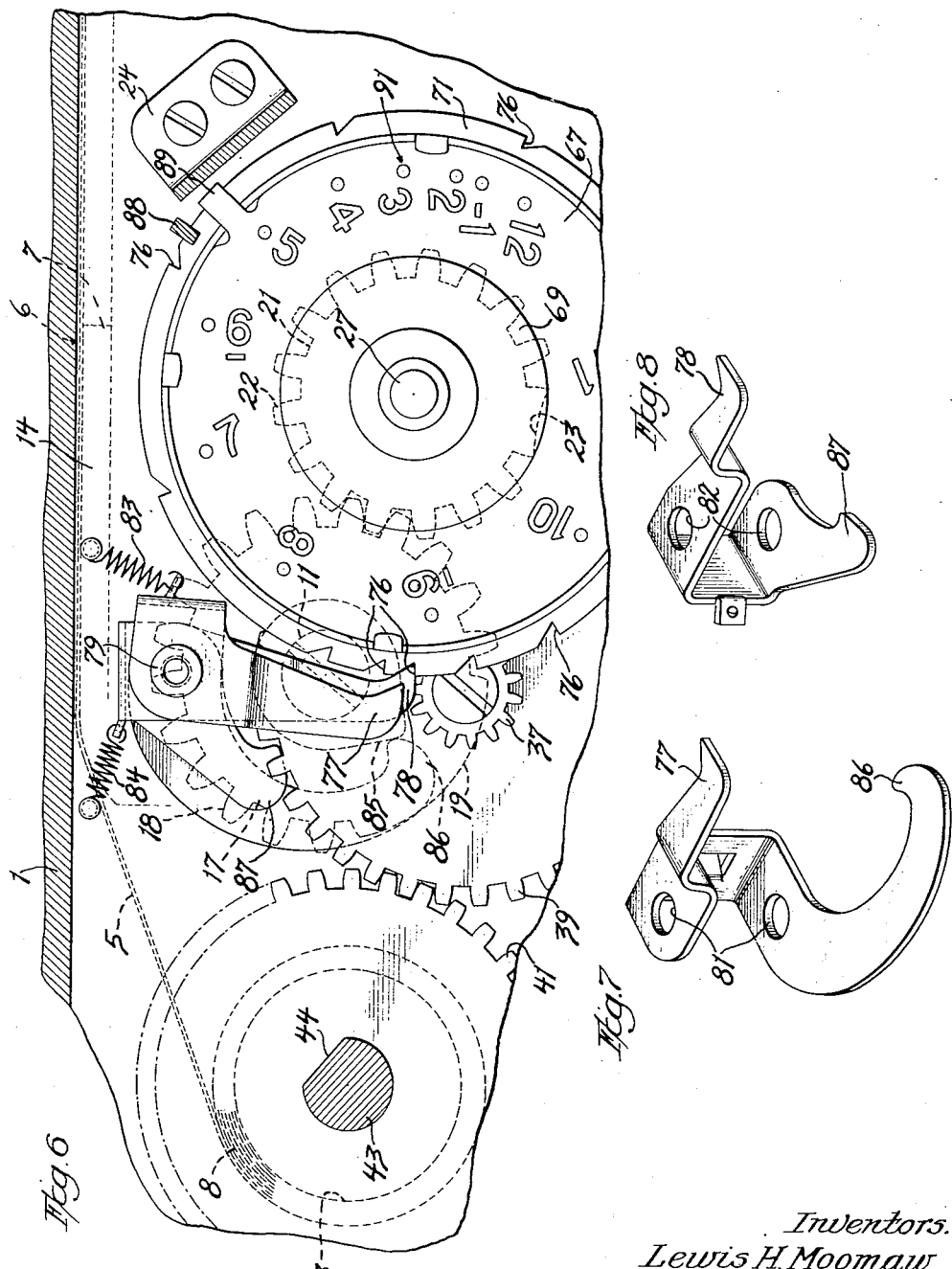
Inventors.
Lewis H. Moomaw
Hugo Bernzott
BY Robert F. Michle
Atty.

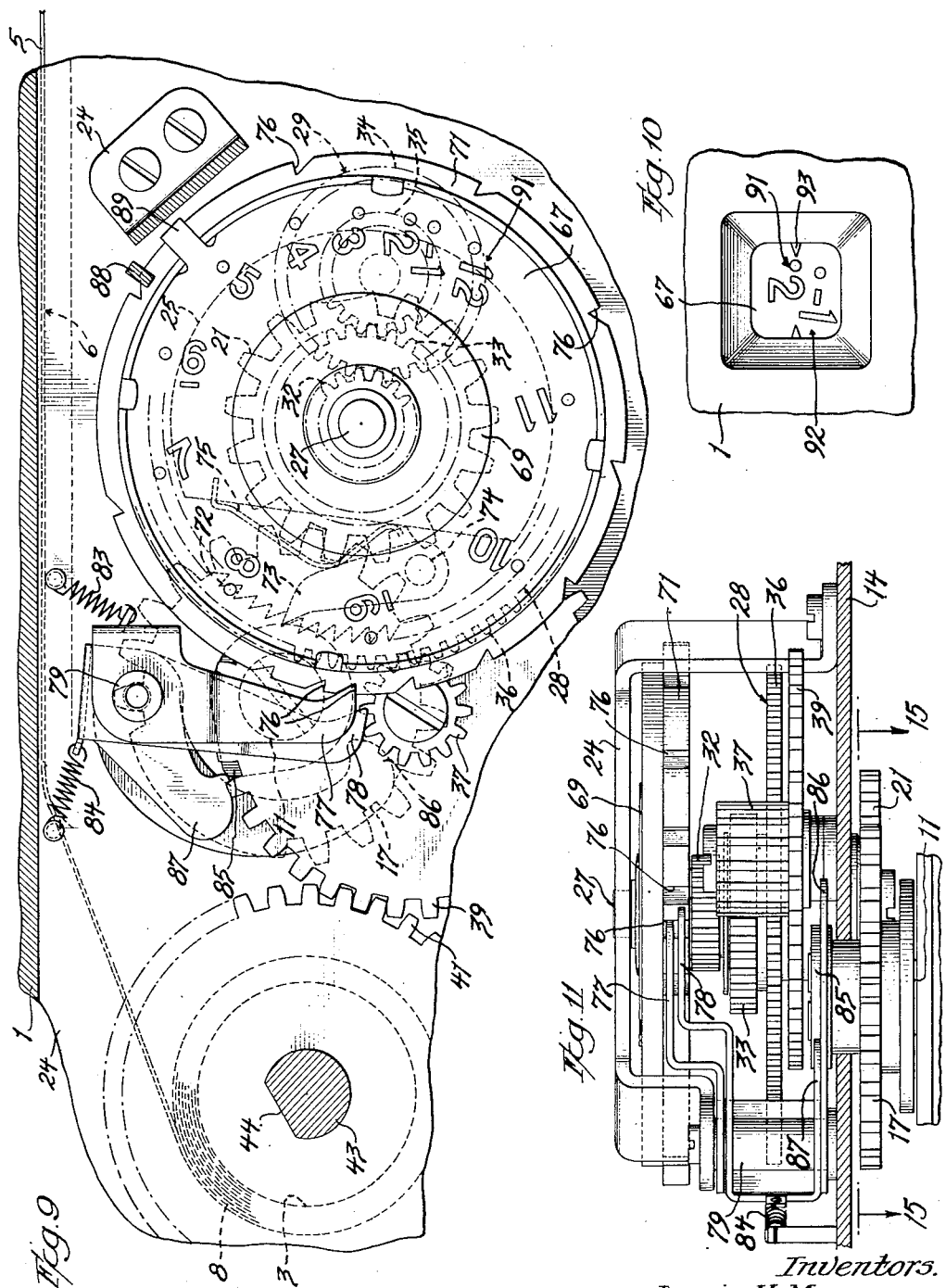

Inventors.
Lewis H. Moomaw
Hugo Bernzott

Patented June 6, 1944

2,350,693

UNITED STATES PATENT OFFICE 2,350,693

STRIP FEED MECHANISM

Lewis H. Moomaw, Wilmette, and Hugo Bernzott, Chicago, Ill., assignors to The Bell & Howell Company, Chicago, Ill., a corporation of Illinois Application August 13, 1943, Serial No. 498,534

19 Claims. (Cl. 242—71)

Our invention relates particularly to photographic cameras of the successive exposure roll film loading type.

The general object of the invention resides in the provision of novel and effective means whereby the rotation of a strip roll member or spool carrying a roll of a strip is utilized for feeding the strip step by step and is so controlled that the lineal movement of the strip is of substantially the same extent with each feed movement thereof, the invention compensating for the varying diameter of the roll of the strip on the strip roll member as the strip is fed. As applied to a photographic camera of the above type, the invention is utilized to position successive photographic frames of a film strip at the exposure aperture of the camera and affords desirably uniform spacing of the successive photographic frames on the film strip without resort to mechanism cooperating with lineally spaced perforations of the film strip or the like.

Particularly with reference to a photographic camera of the above type, further objects of the invention reside in the provision of such a feed mechanism which is adapted to be controlled with the exposure mechanism of the camera, and in the provision with such feeding mechanism of means whereby the installation and removal of the film strips are facilitated in that provision is made for conveniently winding the end portions of the strips, such as the light excluding leaders of the usual photographic roll film, and in that provision is made for conveniently resetting the feeding mechanism and a frame indicating device as incidents of installation and removal of the strips.

The invention will be better understood by reference to the accompanying drawings in which—

Figure 1 is a top plan view of a photographic camera embodying our invention and having a portion of the casing thereof broken away;

Figure 2 is a front elevation of the same;

Figure 4 is a partial sectional view substantially on the line 4—4 of Figure 2;

Figure 5 is a partial top plan view of the camera showing the frame indicating device indicating the film strip position of Figure 4;

Figure 6 is a view similar to Figure 4 showing parts in different positions than those in which they are shown in Figure 4 and with parts omitted;

Figures 7 and 8 are perspective views of the two adjustment pawls of the mechanism as hereinafter described;

Figure 9 is a view similar to Figures 4 and 6 showing parts in different positions than those in which they are shown in Figures 4 and 6;

Figure 10 is a view similar to Figure 5 showing the frame indicating device indicating the film strip position of Figure 9;

Figure 11 is a sectional view substantially on the line 11—11 of Figure 3;

Figure 3:
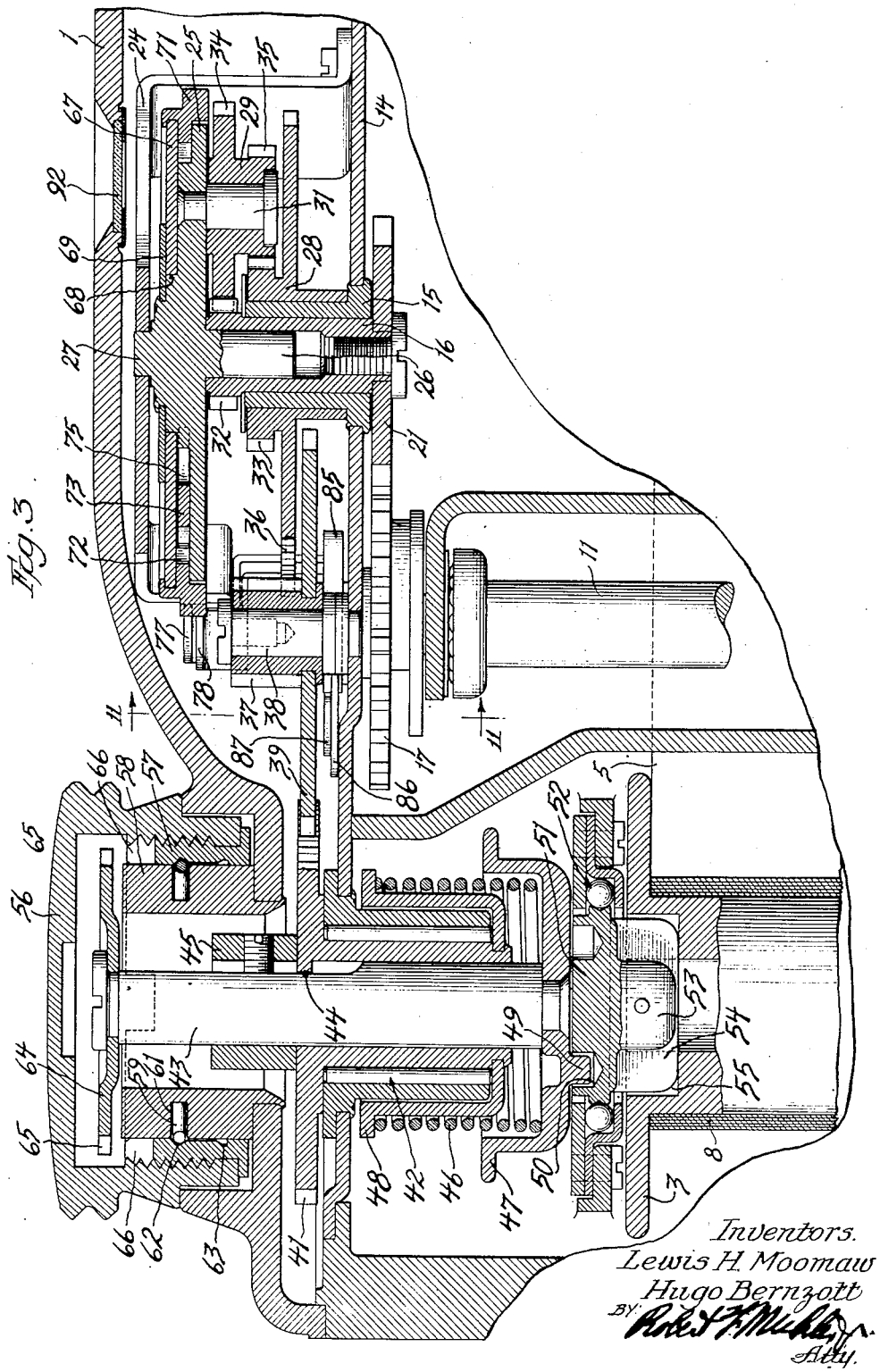
Figure 3 is a partial sectional view substantially on the line 3—3 of Figure 1.

Referring to the drawings, 1 designates the casing of a photographic camera of the aforementioned type, and disposed within this casing respectively at opposite sides thereof are rotatable parallel film spools 2 and 3, these spools being mounted for insertion and removal as is usual with present day film roll loading cameras. See particularly Figures 1 and 2.

As is usual with such a camera, the camera is loaded by installing the spool 2 carrying, in the form of a roll 4 thereon, an unexposed film strip 5 provided with the usual light excluding leaders at both ends, threading the forward leader across a usual guide 6 provided with an exposure aperture 7, securing the forward leader of the film strip on the spool 3, and, after the camera is closed, rotating the spool 3 to wind the film strip into a roll 8 thereon to a sufficient extent to bring the first exposure frame of the film strip into registry with the exposure aperture for exposing the same.

After each exposure the spool 3 is rotated to wind the film strip thereon to a sufficient extent to register the succeeding exposure frame of the film strip with the exposure aperture until the strip is fully exposed, after which the spool 3 is rotated to wind the following leader of the film strip thereon. Then the spool 3 carrying the entire film strip in the form of the roll 8 thereon is removed from the camera pursuant to reloading the same.

Mounted within the lower portion of the casing 1 is a spring power motor, generally designated at 9, which drives a rotatable vertically disposed drive shaft 11 and a centrifugal speed controlling governor, generally designated at 12, by gearing generally designated at 13.

Operation of the motor 9 is controlled by a suitable manually controlled releasable stop mechanism, not shown, which is adapted to stop the mechanism at a fixed angular position of the shaft 11 during each revolution of this shaft, and an exposure shutter, also not shown and controlling the exposure of the film strip 5 at the exposure aperture 7, is automatically actuated in timed relation with the shaft 11 to effect an exposure with each revolution of this shaft.

The upper end of the shaft 11 is rotatably mounted on a horizontal frame plate 14 disposed upwardly within the casing 1. See Figures 3 and 11. A vertically disposed concentrically bored bushing 15 is secured on the frame plate 14 in parallelism with the shaft 11, and a concentrically bored spindle 16 extends through and is rotatably mounted in the bore of the bushing 15.

An intermittent feed drive spur gear 17 is secured on the shaft 11 immediately below the frame plate 14 and is provided with angularly succeeding spur gear toothed drive and convexed surfaced lock portions respectively designated at 18 and 19. See also Figure 15. An intermittent feed driven spur gear 21 is secured on the spindle 16 immediately below the frame plate 14 and is provided with angularly succeeding spur gear toothed drive and concave surfaced lock portions respectively designated at 22 and 23. The gears 17 and 21 engage to provide intermittent feed gearing between the shaft 11 and the spindle 16 and intermittently drive the spindle one revolution to each revolution of the shaft, angular movement being transmitted to the spindle from the shaft while the gear portions 18 and 22 are engaged as shown in Figures 6 and 9, and the spindle being locked against angular movement while the lock portions 19 and 23 are engaged as shown in Figures 4 and 15.

The film strip 5 is wound upon the spool 3 with rotation of the spindle 16 by mechanism presently to be described, and by reason of this spindle being intermittently driven from the shaft 11, the film strip is intermittently advanced across the exposure aperture 7 for the exposure of successive photographic frames thereof, the camera shutter being actuated for each exposure while lock portions 19 and 23 of the gears 17 and 21 are engaged so that the spindle 16 and consequently the film strip is at rest during exposure.

Figure 15:
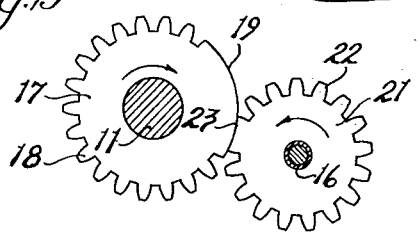
Figure 15 is a partial sectional view substantially on the line 15—15 of Figure 11.

The lock portion 19 of the gear 17 is of substantially angular extent so that the rest periods of the spindle 16 and the film strip 5 are of correspondingly considerable extent, and the shaft 11 and the spindle 16 with their gears 17 and 21 rotate in the direction of the arrows in Figure 15 and the stopping position of the shaft 11 and the gear 17 as controlled by the manually controlled releasable stop mechanism above referred to is shown in Figures 4 and 15 in which the lock portion 19 has just entered into locking engagement with the lock portion 23. Accordingly, not only is adequate time provided for the actuation of the exposure shutter during the rest periods of the film strip even when the shaft 11 is continuously rotated through a number of cycles as in "continuous operation," but acceleration of the motor 9 and shaft 11 is permitted before the load of winding the film strip is assumed thereby.

Again referring particularly to Figures 3 and 11, a frame member 24 is secured on the frame plate 14 in upwardly spaced relation therewith, and a carrier disk 25 is rotatably mounted in coaxial relation with the spindle 16 by means of oppositely extending axial spindle portions 26 and 27 of the carrier disk being rotatably mounted respectively in the bore of the spindle 16 and on the frame member 24, as best shown in Figure 3.

A bored gear member 28 has its bore rotatably engaged on the exterior of the bushing 15, and the spindle 16, the carrier disk 25 and the gear member 28 are thus relatively rotatable coaxially. A bored countergear member 29 is rotatably mounted on the carrier disk 25 in parallelism to the common axis of the carrier disk, the spindle 16 and the gear member 28 by means of a stud 31 secured on the carrier disk and rotatably engaged by the bore of the gear member 29, and as so carried by the carrier disk this gear member 29 is mounted for bodily adjustment with the carrier disk angularly about the common axis of the spindle 16 and the gear member 28.

The spindle 16 is provided with a spur gear 32 at its upper end, and the gear member 28 is provided with a spur gear 33 at its upper end, these gears being thus relatively rotatable coaxial gears. See Figures 3, 4, 9 and 11. The countergear member 29 is provided with two spur gears 34 and 35, and the gear 34 meshes with the gear 32 and the gear 35 meshes with the gear 33. The gears 32 and 33 are of different diameters and the gears 34 and 35 are of different diameters corresponding with the different diameters of the gears 32 and 33, so that the gears 34 and 35, intermediate the gears 32 and 33, mesh with the gears 32 and 33 in differential relation therewith. The countergear member 29 with its gears 34 and 35, as carried by the rotatable carrier disk 25, being bodily adjustable angularly about the axis of the gears 32 and 33 and the gears 34 and 35 having the aforesaid differential relation with the gears 32 and 33, this bodily adjustment of the countergear member 29 effects variation of the relative angular movement of the gears 32 and 33, it being observed that the countergear member is yieldably urged in its adjustment movement as an incident of drive through these gears in one direction or the other depending upon the direction of the driving torque through the gears.

The gear member 28 is provided with a large spur gear 36 which meshes with a bored spur pinion gear 37 rotatably mounted on a stud 38 mounted on the frame plate 14. A large spur gear 39 secured on the pinion gear 37 meshes with a bored spur gear 41 disposed in coaxial relation with the spool 3 and rotatably mounted on the frame plate 14 as generally designated at 42 in Figure 3.

A shaft 43 is slidably engaged in the bore of the gear 41 and is rotatably secured therewith as designated at 44, and downward movement of this shaft is limited by a collar 45 secured on the shaft and bearing downwardly on the gear 41. See Figure 3. The shaft 43 is normally maintained in its lower position by a spring 46 bearing downwardly on a clutch member 47 secured on the lower end of this shaft and bearing upwardly on a flanged sleeve 48 secured with the gear 41, and a clutch projection 49 on this clutch member engages downwardly into a clutch recess 50 of a spool end carrier 51 rotatably mounted, as designated at 52, in coaxial relation with the shaft 43 and gear 41.

The carrier 51 is provided with a downwardly projecting axial spindle portion 53 engageable into the upper end of the bore of the spool 3 for carrying this end of the spool, and is provided with a diametrically disposed clutch formation 54 which is engageable in a diametrical slot 55 at the upper end of the spool 3 for rotating the spool from the shaft 43 and the gear 41. Disengagement of the clutch member 47 from the spool carrier 51 is of no concern herein, so that for the purposes hereof it may be assumed that the gear 41 has constant driving relation with the spool 3 while the spool is engaged with the spool carrier.

A manually actuable bored knob 56 is slidably and rotatably mounted on the exterior of the casing 1 in coaxial relation with the shaft 43 by means of a bushing 57 secured in the bore of the knob and slidably and rotatably mounted on another bushing 58 secured on the upper wall of the casing 1. A circular spring 59 is engaged in a circumferential groove 61 on the bushing 58 and expands outwardly against the bore of the bushing 57 and is alternately releasably engageable with axially spaced circular grooves 62 and 63 in the bore of the bushing 57 to predeterminately position the knob respectively in lower and upper axial positions thereof.

A clutch disc 64 is secured on the upper end of the shaft 43 within the knob 56 and is provided with peripheral clutch lugs 65, and the upper end of the bushing 57 is provided with radial clutch recesses 66. In the lower position of the knob 56, as shown in Figure 3, the clutch disk 64 is disposed above the bushing 57 so that the knob is free to rotate independently of the shaft 43 with the result that accidental rotation of the knob does not cause rotation of the spool 3, this lower position of the knob being its normal position when the camera is being operated. In the upper position of the knob 56, the lugs 65 of the clutch disk 64 are engaged by the recesses 66 of the bushing 57 so that rotation of the knob effects rotation of the spool 3 to wind the film strip 5 thereon, the knob being thus adapted to be utilized to manually wind the leaders of the film strip on this spool without necessitating operation of the camera mechanism as incidents of loading and unloading the camera.

Assuming the countergear member 29 to be held stationary with respect to its bodily adjustment angularly about the common axis of the gears 32 and 33 by holding the carrier disk 25 against its angular movement on this axis, the driving gear train, comprising the gears 32, 33, 34, 35, 36, 37, 39 and 41, is operative to drive the spool 3 from the spindle 16.

The shaft 11 rotates one revolution during each exposure cycle of the camera and the spindle 16, as intermittently driven from the shaft 11 through the intermittent feed gears 17 and 21, also rotates one revolution during each exposure cycle of the camera to intermittently rotate the spool 3 and wind the film strip 5 in the form of the roll 8 thereon and to thereby intermittently advance the film strip across the exposure aperture 7 for the exposure of successive photographic frames of the film strip as previously explained.

As the diameter of the roll 8 on the spool 3 increases in diameter, the angular movement of the spool required to effect a given lineal movement of the film strip 5 decreases, and in order to effect successive equal lineal movements of the film strip with successive revolutions or equal angular movements of the spindle 16 as it is intermittently driven from the shaft 11, the bodily or adjustment movement of the countergear member 29, which effects variance of the relative angular movement of the gears 32 and 33 as previously explained and consequently effects variance of the angular movement of the spool 3 relative to angular movement of the spindle 16, is utilized and automatically controlled by mechanism now to be described.

An annular member 67 is rotatably mounted on the carrier disk 25 in coaxial relation therewith, as designated at 68, and a spring washer 69 secured with the carrier disk axially frictionally engages the member 67 between it and the body of the carrier disk to provide a yieldable friction drive clutch therebetween. See particularly Figures 3 and 4. A ratchet member 71 in the form of a ring is secured on the periphery of the member 67 in concentric relation with the carrier disk 25. The ratchet member 71 is thus mounted for rotation co-axially of the gears 32 and 33 and of the carrier disk, and the aforesaid yieldable friction drive clutch is operative between the ratchet member and the countergear member 29, carried by the carrier disk, with respect to the adjusting movement thereof.

The inner periphery of the ratchet member is provided with ratchet teeth 72, and a pawl 73, pivotally mounted on the carrier disk 25, as designated at 74, and yieldably urged into engagement with the ratchet teeth 72 by a spring 75, cooperates with the ratchet teeth to form an automatically engaging one way clutch operative between the ratchet member and the countergear member 29, carried by the carrier disk, with respect to the adjusting movement thereof and permitting overrunning movement of the countergear member and carrier disk in one direction with respect to the ratchet member.

Referring to Figures 4, 6 and 9, the shaft 11 rotates clockwise as the camera is operated. This results in the gear 32 of the spindle 16 rotating counterclockwise, the gears 34 and 35 clockwise, the gears 33 and 36 counterclockwise, the gears 37 and 39 clockwise, and the gear 41 and with it the spool 3 counterclockwise to wind the film strip 5 on the roll 8 on the spool. The yieldable urge of the countergear member 29, comprising the gears 34 and 35, in its bodily or adjustment movement, as previously explained, incident to this driving condition is clockwise, the carrier disk 25 being similarly yieldably urged. The arrangement of the ratchet teeth 72 and the pawl 73 of the aforesaid one way clutch is such that the carrier disk 25 positively drives the ratchet member 71 in this direction, so that the ratchet member is yieldably urged clockwise in fixed relation with the carrier disk and countergear member 29 incident to this driving condition.

The ratchet member 71 is provided on its outer periphery with pawl engageable or ratchet abutments 76 facing in the direction in which it is driven by said one way clutch, namely, clockwise in Figures 4, 6 and 9, and these ratchet abutments are progressively increasingly spaced angularly of the ratchet member in the opposite direction, namely, counterclockwise in these figures.

Two escapement pawls 77 and 78 are pivotally mounted coaxially in parallelism with the axis of the ratchet member 71 by means of a stud 79 secured between the frame plate 14 and frame member 24 and engaged through bores 81 and 82 respectively through these pawls. See particularly Figures 4, 7, 8 and 11. These pawls are yieldably urged into abutment engaging relation with the ratchet member 71 to engage the abutments 76 respectively by springs 83 and 84.

A cam 85 is fixed on the shaft 11 to rotate therewith, and the pawls 77 and 78 are provided respectively with cam arms 86 and 87 disposed to be engaged sequentially by the cam 85 as it rotates with the shaft 11, so that as the shaft 11 is rotated, these pawls are sequentially actuated out of and into abutment engaging relation with the ratchet member 71 with each revolution of the shaft 11 and the spindle 16.

The pawl 77, as will be observed in Figures 4, 6 and 9, has abutment engaging relation with the ratchet member 71 at a point advanced in the clockwise direction of movement of the ratchet member from the point at which the pawl 78 has abutment engaging relation with the ratchet member, and assuming the aforesaid clockwise rotation of the shaft 11 and resulting counter-clockwise rotation of the spool 3 to wind the film strip 5 in the roll 8 thereon and yieldable urge of the ratchet member 71 clockwise, the pawl 77 moves out of and into abutment engaging relation with the ratchet member 71 in advance of movement of the pawl 78 out of and into said abutment engaging relation with each revolution of the shaft 11 and the spindle 16. As a result, the ratchet member 71, under its yieldable urge in the clockwise direction incident to the drive from the spindle 16 to the spool 3 to wind the film strip 5 in the roll 8 on the spool, is permitted to progressively advance in the clockwise direction step by step, one step with each revolution of the shaft 11 and spindle 16.

Figure 4 illustrates the aforesaid stop position of the mechanism in which the pawl 77 is engaged with a ratchet abutment 76 to position the ratchet member 71 against movement in the clockwise direction. Upon rotation of the shaft 11 in the clockwise direction from the position of Figure 4, the drive of the spindle 16 and the spool 3 is assumed by the shaft 11 after an interval and then the cam 85 engages the cam arm 86 and actuates the pawl 77 out of and into abutment engaging relation with the ratchet member 71, thus disengaging this pawl from the ratchet abutment 76 with which it has been engaged. The ratchet member 71, being thus released, advances clockwise under its yieldable urge until the pawl 78 engages the succeeding ratchet abutment 76 and stops movement of the ratchet member as shown in Figure 6. Upon further clockwise rotation of the shaft 11, the cam 85 engages the cam arm 87 and actuates the pawl 78 out of and into abutment engaging relation with the ratchet member 71, thus disengaging this pawl from the said succeeding ratchet abutment 76. The ratchet member 71, being thus released, advances clockwise under its yieldable urge until the pawl 77 engages the said succeeding ratchet abutment 76 and stops movement of the ratchet member as shown in Figure 9, after which the shaft 11 and spindle 16 each completes its revolution and they assume the positions in which they are shown in Figure 4. It will be observed that at all times one or the other of the pawls 77 and 78 are in abutment engaging relation with the ratchet member 71 so that the possibility of the pawl engagement of one of the abutments 76 being skipped is eliminated.

The frame member 24 is provided with a stop lug 88 which lies in the path of a radial stop arm 89 on the member 67, thus providing stop means limiting the adjusting movement of the ratchet member 71 in both directions. Assuming a film strip 5 to be installed in the camera with its forward leader wound in the roll 8 on the spool 3 and the first photographic frame thereof registered with the exposure aperture 7 for exposure, the ratchet member 71 is positioned, in a manner hereinafter described, in its extreme counterclockwise position with the lug 88 engaged by the stop arm 89, as shown in Figure 4, in which position the pawl 77 is engaged with the first of the ratchet abutments 76.

Incidental to the exposure of the first photographic frame of the film strip, the shaft 11 and spindle 16 rotate one revolution and the pawls 77 and 78 are actuated as above described to advance the ratchet member 71 and countergear member 29 to the position shown in Figure 9 in which the pawl 77 is engaged by the second of the ratchet abutments 76, the second photographic frame of the film strip being registered with the exposure aperture 7 for exposure upon the completion by the shaft 11 and spindle 16 of the instant revolution thereof and the assumption thereby of the positions shown in Figures 4 and 15.

This procedure takes place with the exposure of each succeeding photographic frame of the film strip until the film strip is fully exposed, the ratchet member 71 and the countergear 29 being progressively advanced by steps, one step with each exposure operation of the camera, progressively increasing in extent by reason of the progressively increasing spacing of the ratchet abutments 76 in the counterclockwise direction of the ratchet member 71.

As the film strip 5 is wound in the roll 8 on the spool 3, less angular movement of the spool 3 is required to lineally move the film strip 5 the extent a photographic frame thereof as the diameter of the roll 8 increases, and the progressively increasing advance of the ratchet member 71 and countergear member 29 as above explained effects progressively decreasing angular movements of the spool 3, corresponding with the increasing diameter of the roll 8, with the successive equal movements or revolutions of the spindle 16, so that the intermittent feed movements of the film strip are equal.

The member 67 is provided on its upper face with a scale 91 extending angularly thereabout which is observable through a window 92 in the camera casing and indicates in cooperation with an index mark 92 on this window the successive exposure frames of the film strip 5 as the strip is fed. The indication of Figure 5 corresponds with the condition of Figure 4, and the indication of Figure 10 corresponds with the condition of Figure 9.

Figure 12:
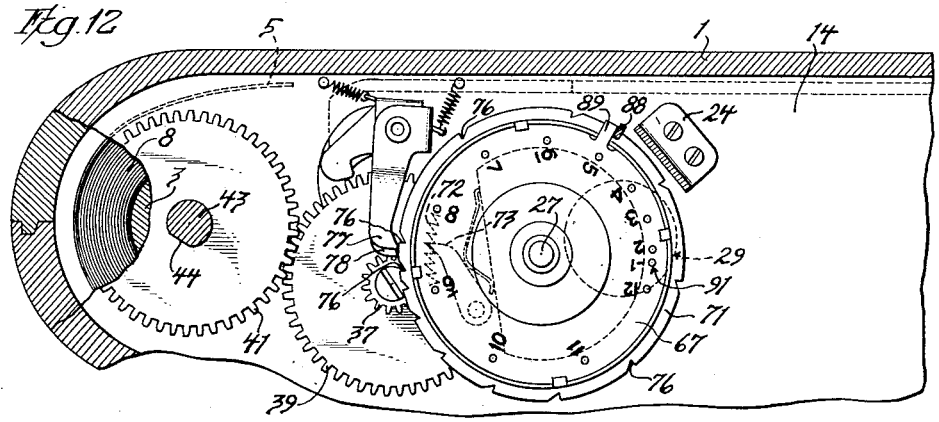
Figures 12, 13 and 14 are views similar to Figure 4 showing parts in different positions incident to removal and installation of the film strips.

When the last exposure frame of the film strip 5 has been fed across the exposure aperture 7, the ratchet member 71 and countergear member 29 have reached the extremity of their clockwise movement in which the stop arm 89 engages against the stop lug 88 in the clockwise direction and prevents further clockwise movement of the ratchet member 71 and countergear member 29, as shown in Figure 12. Further rotation of the shaft 11 continues to drive the spool 3, and the following leader of the film strip 5 may be wound on the roll 8 in this manner, though the knob 56 may be utilized for this purpose by positioning it in its upper position to engage the clutch recesses 66 with the clutch lugs 65 and manually rotating the knob in the direction to rotate the spool 3 counterclockwise, which is the direction in which this spool is rotated by the spindle 16. The knob 56 is utilized in the same manner to wind the forward leader of the film strip 5 on the spool 3 and bring the first photographic frame of the film strip into registry with the exposure aperture 7, this position of the film strip being determined by observing the usual marking on the strip through a usual observance window, not shown, in the camera casing.

As above described, drive of the spool 3 from the spindle 16 in the winding direction, namely counterclockwise, yieldably urges the countergear member 29 and with it the ratchet member 71 in the clockwise direction, the ratchet member being positively actuated from the countergear member in this direction by the pawl 73 engaging the ratchet teeth 72. However, drive of the spool 3 from the knob 56 in the same direction, the spindle 16 being stationary, actuates the countergear member and with it the ratchet member 71 in the opposite or counterclockwise direction because the driving torque exerted through the gearing when the spool 3 is driven from the knob 56 is opposite that exerted through the gearing when the spool 3 is driven from the spindle 16, the ratchet member being yieldably actuated from the countergear member in the counterclockwise direction by the friction clutch provided by the spring washer 69 and the pawl 73 engaging the ratchet teeth 72 permitting overrunning movement of the countergear member with respect to the ratchet member in the counterclockwise direction.

Figure 13:
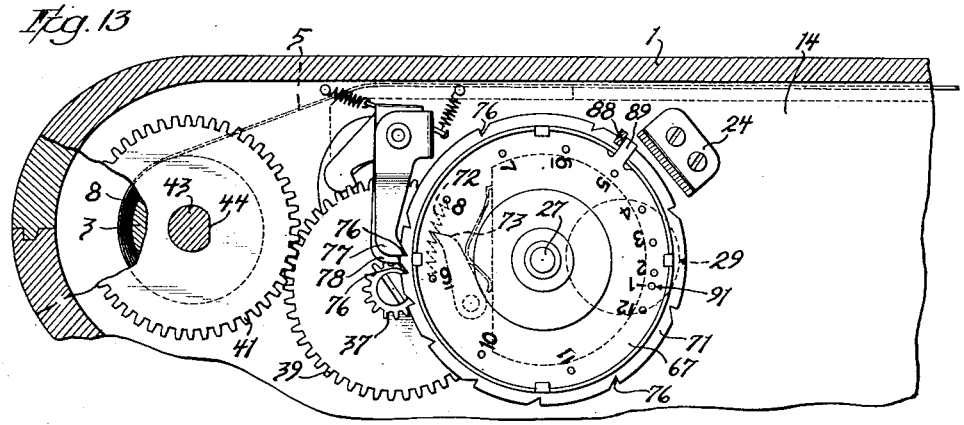
Figure 14:
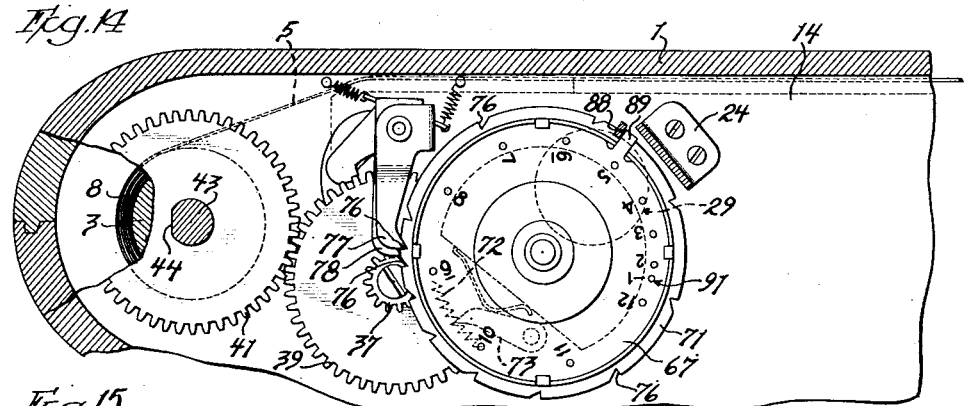

Accordingly, when the spool 3 is driven by the knob 56, as to wind a leader of the film strip on the spool, the ratchet member 71 is actuated counterclockwise until the stop lug 88 is engaged by the stop arm 89 in this direction, thus resetting the ratchet member in its initial position for the control of the angular movement of the spool 3 incident to operation of the camera, as shown in Figure 13. After the ratchet member 71 has attained its said initial position, further drive of the spool 3 from the knob 56, as to complete the winding of a leader of the film strip on the spool, is permitted by slippage of the friction clutch provided by the spring washer 69 and the pawl 73 engaging the ratchet teeth 72 permitting overrunning movement of the countergear member 29 with respect to the ratchet member 71 in the counterclockwise direction, thus attaining the condition shown in Figures 4 and 14 where the forward leader of the film strip is fully wound on the spool 3 with the first photographic frame of the film strip registered with the exposure aperture 7, the pawl 73 automatically engaging a tooth of the ratchet teeth 72 in the instant relative positions of the ratchet and countergear members preparatory to positively driving the ratchet member from the countergear member in the clockwise direction for the control of the angular movement of the spool 3 incident to operation of the camera.

While we have thus described our invention, we do not wish to be limited to the precise details described, as changes may be readily made without departing from the spirit of our invention, but having thus described our invention, we claim as new and desire to secure by Letters Patent the following:

1. In a device of the character described, the combination with a rotatable strip roll member, of a second rotatable member, a rotatory driving train operative between said roll and second members comprising angularly engaged rotatable drive members one of which is bodily adjustable relative to the other to vary the angular movement of said roll member relative to that of said second member, and adjusting means controlled in timed relation with said second member and operative to relatively adjust said drive members in predetermined progressively varying extents respectively incidental to successive equal angular movements of said second member whereby to effect progressive variation of angular movements of said roll member, corresponding with the varying diameter of a strip roll on said roll member, with said successive movements of said second member.

2. In a device of the character described, the combination with a rotatable strip roll member, of a second rotatable member, a driving gear train operative between said roll and second members comprising meshed gears one of which is bodily adjustable relative to the other in a plane normal to the axis of the other to vary the angular movement of said roll member relative to that of said second member, and adjusting means controlled in timed relation with said second member and operative to adjust said gear in predetermined progressively varying extents respectively incidental to successive equal angular movements of said second member whereby to effect progressive variation of angular movements of said roll member, corresponding with the varying diameter of a strip roll on said roll member, with said successive movements of said second member.

3. In a device of the character described, the combination with a rotatable strip roll member, of a second rotatable member, of a driving gear train operative between said roll and second members comprising two relatively rotatable coaxial gears respectively connected with said roll and second members and intermediate rotatable gear means meshing with both of said coaxial gears in differential relation therewith and bodily adjustable angularly on the axis of said coaxial gears to vary the angular movement of said roll member relative to that of said second member, and adjusting means controlled in timed relation with said second member and operative to adjust said intermediate gear means in predetermined progressively varying extents respectively incidental to successive equal angular movements of said second member whereby to effect progressive variation of angular movements of said roll member, corresponding with the varying diameter of a strip roll on said roll member, with said successive movements of said second member.

4. In a device of the character described, the combination with a rotatable strip roll member, of a second rotatable member, of a driving gear train operative between said roll and second members comprising two relatively rotatable coaxial spur gears of different diameters respectively connected with said roll and second members and a rotatable countergear member provided with two spur gears of different diameters corresponding with the different diameters of said coaxial gears and respectively meshing therewith and said countergear member being bodily adjustable angularly about the axis of said coaxial gears to vary the angular movement of said roll member relative to that of said second member, and adjusting means controlled in timed relation with said second member and operative to adjust said countergear member about said axis in predetermined progressively varying extents respectively incidental to successive equal angular movements of said second member whereby to effect progressive variation of angular movements of said roll member, corresponding with the varying diameter of a strip roll on said roll member, with said successive movements of said second member.

5. In a device of the character described, the combination with a rotatable strip roll member, of a movable second member, driving means operative between said roll and second members including a drive member adjustable to vary the angular movement of said roll member relative to movement of said second member, a movable ratchet member operatively connected with said drive member to adjust the same and yieldably urged in one direction and provided with pawl engageable abutments facing in said direction and progressively variably spaced lineally of the movement thereof, escapement pawl means actuated in timed relation with said second member out of and into abutment engaging relation with said ratchet member with each of successive equal movements of said second member and thereby progressively engaged by said abutments respectively with said successive movements whereby to effect progressive variation of angular movements of said roll member, corresponding with the varying diameter of a strip roll thereon, with said successive movements of said second member.

6. In a device of the character described, the combination with a rotatable strip roll member, of a movable second member, driving means operative between said roll and second members and adjustable to vary the angular movement of said roll member relative to movement of said second member, adjusting means controlled in timed relation with said second member and operative to adjust said driving means in predetermined progressively varying extents respectively incidental to successive equal movements of said second member whereby to effect progressive variation of angular movements of said roll member, corresponding with the varying diameter of a strip roll thereon, with said equal movements of said second member, and movement controlling means operative on said second member to effect intermittently said equal movements thereof.

7. In a device of the character described, the combination with a rotatable strip roll member, of a second rotatable member, of a driving gear train operative between said roll and second members comprising meshed gears one of which is bodily adjustable in a plane normal to the axis of the other to vary the angular movement of said roll member relative to that of said second member, a movable ratchet member operatively connected with said adjustable gear to adjust the same and yieldably urged in one direction and provided with pawl engageable abutments facing in said direction and progressively variably spaced lineally of the movement thereof, escapement pawl means actuated in timed relation with said second member out of and into abutment engaging relation with said ratchet member with each of successive equal movements of said second member and thereby progressively engaged by said abutments respectively with said successive movements whereby to effect progressive variation of angular movements of said roll member, corresponding with the varying diameter of a strip roll thereon, with said successive movements of said second member, and movement controlling means operative on said second member to effect intermittently said equal movements thereof.

8. In a device of the character described, the combination with a rotatable strip roll member, of a second rotatable member, of a driving gear train operative between said roll and second members comprising two relatively rotatable coaxial gears respectively connected with said roll and second members and intermediate gear means meshing with both of said coaxial gears in differential relation therewith and bodily adjustable angularly on the axis of said coaxial gears to vary the angular movement of said roll member relative to that of said second member and said intermediate gear means being yieldably urged in its adjustment movement in one direction as an incident of the drive of said roll member by said second member, a rotatable ratchet member operatively connected with said intermediate gear means to adjust the same and yieldably urged therewith and provided with pawl engageable abutments facing in the direction of the yieldable urge thereof and progressively variably spaced angularly thereof, escapement pawl means actuated in timed relation with said second member out of and into abutment engaging relation with said ratchet member with each of successive equal movements of said second member and thereby progressively engaged by said abutments respectively with said successive movements whereby to effect progressive variation of angular movements of said roll member, corresponding with the varying diameter of a strip roll thereon, with said successive movements of said second member, and movement controlling means operative on said second member to effect intermittently said equal movements thereof.

9. In a device of the character described, the combination with a rotatable strip roll member, of a second rotatable member, of a driving gear train operative between said roll and second members comprising two relatively rotatable coaxial spur gears of different diameters respectively connected with said roll and second members and a rotatable countergear member provided with two spur gears of different diameters corresponding with the different diameters of said coaxial gears and respectively meshing therewith and said countergear member being bodily adjustable angularly on the axis of said coaxial gears to vary the angular movement of said roll member relative to that of said second member and said countergear member being yieldably urged in one direction as an incident of the drive of said roll member by said second member, a rotatable ratchet member disposed coaxially of said coaxial gears and operatively connected with said countergear member to adjust the same and yieldably urged therewith and provided with pawl engageable abutments facing in the direction of the yieldable urge thereof and progressively variably spaced angularly thereof, escapement pawl means actuated in timed relation with said second member out of and into abutment engaging relation with said ratchet member with each of successive equal movements of said second member and thereby progressively engaged by said abutments respectively with said successive movements whereby to effect progressive variation of angular movements of said roll member, corresponding with the varying diameter of a strip roll thereon, with said equal movements of said second member, and movement controlling means operative on said second member to effect intermittently said equal movements thereof.

10. In a device of the character described, the combination with a rotatable strip roll member, of a movable second member, driving means operative between said roll and second members including a member adjustable to vary the angular movement of said roll member relative to movement of said second member, a movable ratchet member operatively connected with said adjustable member to adjust the same and yieldably urged in one direction of its adjustment movement and provided with pawl engageable abutments facing in said direction and progressively variably spaced lineally of the movement thereof, two escapement pawl means each actuated in timed relation with said second member out of and into abutment engaging relation with said ratchet member with each of successive equal movements of said second member and thereby progressively engaged by said abutments respectively with said successive movements whereby to effect progressive variation of angular movements of said roll member, corresponding with the varying diameter of a strip roll thereon, with said successive movements of said second member, a first of said pawl means having abutment engaging relation with said ratchet member at a point advanced in said direction of movement of said ratchet member from the point at which the second of said pawl means has abutment engaging relation with said ratchet member and said pawl means being so timed that said first pawl means moves out of and into abutment engaging relation with said ratchet member in advance of movement of said second pawl means out of and into said abutment engaging relation, and movement controlling means operative on said second member to effect intermittently said equal movements thereof.

11. In a device of the character described, the combination with a rotatable strip roll member, of a movable second member, driving means operative between said roll and second members and adjustable to vary the angular movement of said roll member relative to movement of said second member, adjusting means controlled in timed relation with said second member and operative to adjust said driving means in predetermined progressively varying extents respectively incidental to successive equal movements of said second member whereby to effect progressive variation of angular movements of said roll member, corresponding with the varying diameter of a strip roll thereon, with said successive movements of said second member, a drive member, and intermittent drive means operative between said drive and second members to effect intermittently said successive movements of said second member respectively with successive equal movements of said drive member.

12. In a device of the character described, the combination with a rotatable strip roll member, of a second rotatable member, a driving gear train operative between said roll and second members comprising meshed gears one of which is bodily adjustable relative to the other in a plane normal to the axis of the other to vary the angular movement of said roll member relative to that of said second member, adjusting means controlled in timed relation with said second member and operative to adjust said adjustable gear in predetermined progressively varying extents respectively incidental to successive equal movements of said second member whereby to effect progressive variation of angular movements of said roll member, corresponding with the varying diameter of a strip roll thereon, with said successive movements of said second member, a rotatable drive member, and intermittent drive gearing operative between said drive and second members to effect intermittently said successive movements of said second member respectively with successive equal movements of said drive member comprising a drive gear member rotatably fixed with said drive member and provided with angularly succeeding gear toothed drive and convex surfaced lock portions and a driven gear member rotatably fixed with said second member and provided with angularly succeeding gear toothed drive and concave surfaced lock portions respectively cooperating with the drive and lock portions of said drive gear member to intermittently drive said second member.

13. In a device of the character described, the combination with a rotatable strip roll member, of a second rotatable member, a driving gear train operative between said roll and second members comprising meshed gears one of which i. bodily adjustable relative to the other in a plane normal to the axis of the other to vary the angular movement of said roll member relative to that of said second member and said adjustable gear being yieldably urged in one direction as an incident of the drive between said roll and second members, a rotatable ratchet member operatively connected with said adjustable gear to adjust the same and yieldably urged therewith and provided with pawl engageable abutments facing in the direction of the yieldable urge thereof and progressively variably spaced angularly thereof, escapement pawl means actuated in timed relation with said second member out of and into abutment engaging relation with said ratchet member with each of successive equal movements of said second member and thereby progressively engaged by said abutments respectively with said successive movements whereby to effect progressively variation of angular movements of said roll member, corresponding with the varying diameter of a strip roll thereon with said successive movements of said second member, a rotatable driving member, and intermittent feed gearing operative between said driving and second members comprising a driving gear member rotatably fixed with said driving member and provided with angularly succeeding gear toothed drive and convex surfaced lock portions and a driven gear member rotatably fixed with said second member and provided with angularly succeeding gear toothed drive and concave surfaced lock portions respectively cooperating with the drive and lock portions of said driving gear member to intermittently drive said second member.

14. In a device of the character described, the combination with a rotatable strip roll member, of a movable second member, driving means operative between said roll and second members including a drive member adjustable to vary the angular movement of said roll member relative to movement of said second member, a movable adjusting member, drive clutch means operative between said drive and adjusting members with respect to adjustment movements thereof and operative to permit overrunning movement of said drive member in one direction with respect to said adjusting member, stop means limiting movement of said adjusting member in said direction, adjustment means under the control of said second member and operative to effect movement of said adjusting member in the direction opposite said first mentioned direction in predetermined progressively increasing extents respectively incidental to successive equal movements of said second member whereby to effect progressively decreasing angular movements of said roll member, corresponding with the increasing diameter of the roll of a strip being wound thereon, with said successive movements of said second member and said adjustment means being releasable to permit movement of said adjusting member in said first mentioned direction, and movement controlling means operative on said second member to effect intermittently said equal movements thereof.

15. In a device of the character described, the combination with a rotatable strip roll member, a movable second member, driving means operative between said roll and second members including a drive member adjustable to vary the angular movement of said roll member relative to movement of said second member and yieldably urged in its adjusting movement, a movable ratchet member, an automatically engaging one way clutch operative between said drive and ratchet members with respect to adjustment movements thereof and permitting overrunning movement of said drive member in one direction with respect to said ratchet member and effecting drive of said ratchet member with movement of said drive member under its yieldable urge in the opposite direction, stop means limiting movement of said ratchet member in said first mentioned direction, said ratchet member being provided with pawl engageable abutments facing in said opposite direction and progressively increasingly spaced lineally of the movement thereof in said first mentioned direction, escapement pawl means releasably yieldably urged into abutment engaging relation with said ratchet member and actuated in timed relation with said second member out of and into abutment engaging relation with said ratchet member with each of successive equal movements of said second member and thereby progressively engaged by said abutments respectively with said successive movements whereby to effect progressively decreasing angular movements of said roll member, corresponding with the increasing diameter of the roll of a strip being wound thereon, with said successive movements of said second member, and movement controlling means operative on said second member to effect intermittently said equal movements thereof.

16. In a device of the character described, the combination with a rotatable strip roll member, of a second rotatable member, a driving gear train operative between said roll and second members comprising two relatively rotatable coaxial gears respectively connected with said roll and second members and intermediate rotatable gear means meshing with both of said coaxial gears in differential relation therewith and rotatably mounted on a rotatable carrier member disposed coaxially of said coaxial gears for bodily adjustment of said intermediate gear means angularly about the axis of said coaxial gears to vary the angular movement of said roll member relative to that of said second member and said intermediate gear means being yieldably urged in its adjustment movement as an incident of drive through said gear train, a rotatable ratchet member disposed coaxially of said coaxial gears, an automatically engaging one way clutch operative between said carrier and ratchet members with respect to adjustment movements thereof and permitting overrunning movement of said intermediate gear means in one direction with respect to said ratchet member and effecting drive of said ratchet member with movement of said intermediate gear means under its yieldable urge in the opposite direction, stop means limiting movement of said ratchet member in said first mentioned direction, said ratchet member being provided with pawl engageable abutments facing in said opposite direction and progressively increasingly spaced angularly thereof in said first mentioned direction, escapement pawl means releasably yieldably urged into abutment engaging relation with said ratchet member and actuated in timed relation with said second member out of and into abutment engaging relation with said ratchet member with each of successive equal movements of said second member and thereby progressively engaged by said abutments respectively with said successive movements whereby to effect progressively decreasing angular movements of said roll member, corresponding with the increasing diameter of the roll of a strip being wound thereon, with said successive movements of said second member, and movement controlling means operative on said second member to effect intermittently said equal movements thereof.

17. In a device of the character described, the combination of a rotatable strip roll member, of a movable second member, driving means operative between said roll and second members including a drive member adjustable to vary the angular movement of said roll member relative to movement of said second member and yieldably urged in its adjustment movement as an incident of drive through said driving means, a movable adjusting member, drive clutch means operative between said drive and adjusting members in both directions with respect to adjustment movements thereof and yieldable in one direction to permit overrunning movement of said drive member under its yieldable urge in this direction with respect to said adjusting member, stop means limiting movement of said adjusting member in both directions, adjustment means under the control of said second member and operative with actuation of said second member yieldably urging said drive member in the direction opposite said first mentioned direction thereof to effect movement of said adjusting member in the corresponding direction in progressively increasing extents respectively incidental to successive equal movements of said second member whereby to effect progressively decreasing angular movements of said roll member, corresponding with the increasing diameter of the roll of a strip being wound thereon, with said successive movements of said second member and said adjustment means being releasable to permit movement of said adjusting member in the direction corresponding with said first mentioned direction of said drive member, and intermittent drive means operative on said second member to effect intermittently said equal movements thereof including locking means preventing movement of said second member during the rest periods of the intermittent drive thereof.

18. In a device of the character described, the combination with a rotatable strip roll member, of a movable second member, driving means operative between said roll and second members including a drive member adjustable to vary the angular movement of said roll member relative to movement of said second member and yieldably urged in its adjustment movement as an incident of drive through said driving means, a movable ratchet member, drive clutch means operative between said drive and ratchet members in both directions with respect to adjustment movements thereof and yieldable in one direction to permit overrunning movement of said drive member under its yieldable urge in this direction with respect to said ratchet member and comprising an automatically engaging one way clutch operative to drive said ratchet member from said drive member under its yieldable urge in the opposite direction, stop means limiting movement of said ratchet member in both directions, said ratchet member being provided with pawl engageable abutments facing in the direction in which it is driven by said one way clutch and progressively increasingly spaced lineally of the movement thereof in the opposite direction, escapement pawl means releasably yieldably urged into abutment engaging relation with said ratchet member and actuated in timed relation with said second member out of and into abutment engaging relation with said ratchet member with each of successive equal movements of said second member yieldably urging said drive member in the direction opposite said first mentioned direction thereof and thereby progressively engaged by said abutments respectively with said successive movements whereby to effect progressively decreasing angular movements of said roll member, corresponding with the increasing diameter of the roll of a strip being wound thereon, with said successive movements of said second member, and intermittent drive means operative on said second member to effect intermittently said equal movements thereof including locking means preventing movement of said second member during the rest periods of the intermittent drive thereof.

19. In a device of the character described, the combination with a rotatable strip roll member, of a second rotatable member, a driving gear train operative between said roll and second members comprising two relatively rotatable coaxial gears respectively connected with said roll and second members and intermediate rotatable gear means meshing with both of said coaxial gears in differential relation therewith and rotatably mounted on a rotatable carrier member disposed coaxially of said coaxial gears for bodily adjustment of said intermediate gear means angularly about the axis of said coaxial gears to vary the angular movement of said roll member relative to that of said second member and said intermediate gear means being yieldably urged in its adjustment movement as an incident of drive through said gear train, a rotatable ratchet member disposed coaxially of said coaxial gears, drive clutch means operative between said carrier and ratchet members in both directions with respect to angular movement thereof on said axis and yieldable in one direction to permit overrunning movement of said intermediate gear means under its yieldable urge in this direction with respect to said ratchet member and comprising an automatically engaging one way clutch operative to drive said ratchet member from said intermediate gear means under its yieldable urge in the opposite direction, stop means limiting movement of said ratchet member in both directions, said ratchet member being provided with pawl engageable abutments facing in the direction in which it is driven by said one way clutch and progressively increasingly spaced angularly thereof in the opposite direction, escapement pawl means releasably yieldably urged into abutment engaging relation with said ratchet member and actuated in timed relation with said second member out of and into abutment engaging relation with said ratchet member with each of successive equal movements of said second member yieldably urging said intermediate gear means in the direction opposite said first mentioned direction thereof and thereby progressively engaged by said abutments respectively with said successive movements whereby to effect progressively decreasing angular movements of said roll member, corresponding with the increasing diameter of the roll of a strip being wound thereon, with said successive movements of said second member, and intermittent drive means operative on said second member to effect intermittently said equal movements thereof including locking means preventing movement of said second member during the rest periods of the intermittent drive thereof.

LEWIS H. MOOMAW.
HUGO BERNZOTT.